United States Patent
Withers et al.

(10) Patent No.: US 10,111,272 B1
(45) Date of Patent: Oct. 23, 2018

(54) TEMPORARY BLUETOOTH PAIRING

(71) Applicant: AT&T Intellectual Property I, L.P., Atlanta, GA (US)

(72) Inventors: Kim Withers, Helotes, TX (US); Joseph Harten, Long Valley, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/665,983

(22) Filed: Aug. 1, 2017

(51) Int. Cl.
*H04W 76/00* (2018.01)
*H04W 76/14* (2018.01)
*H04W 76/02* (2009.01)
*H04W 76/06* (2009.01)
*H04L 29/08* (2006.01)
*H04W 76/38* (2018.01)

(52) U.S. Cl.
CPC ......... *H04W 76/14* (2018.02); *H04W 76/023* (2013.01); *H04L 67/12* (2013.01); *H04W 76/068* (2013.01); *H04W 76/38* (2018.02)

(58) Field of Classification Search
CPC ... H04W 76/02; H04W 76/023; H04W 4/046; H04W 12/06; H04W 24/08; H04W 4/02; H04W 4/008; H04W 8/005
See application file for complete search history.

(56) References Cited

U.S. PATENT DOCUMENTS

| | | |
|---|---|---|
| 6,529,805 B2 | 3/2003 | Aldrich, III et al. |
| 7,702,312 B2 | 4/2010 | Bollmann et al. |
| 8,230,362 B2 | 7/2012 | Couch |
| 8,473,148 B2 | 6/2013 | Nielsen et al. |

(Continued)

FOREIGN PATENT DOCUMENTS

| | | |
|---|---|---|
| KR | 20150054072 | 5/2015 |
| WO | WO 2015104087 | 7/2015 |

(Continued)

OTHER PUBLICATIONS

Bluetooth SIG, Inc., "Bluetooth Core Specification v5.0," retrieved at https://www.bluetooth.org/DocMan/handlers/DownloadDoc.ashx?doc_id=421043&_ga=2.190461547.1991341843.1501612682-965817824.1498583734 on Aug. 1, 2017 (Large File separated into 59 parts—labeled with page Nos. 1-2822 total).

(Continued)

*Primary Examiner* — Thanh Le
(74) *Attorney, Agent, or Firm* — Hartman & Citrin LLC

(57) ABSTRACT

The concepts and technologies disclosed herein provide a vehicle system that can prompt a user to select a BLUETOOTH pairing type—normal or temporary. In response to receiving selection of a temporary BLUETOOTH pairing type, the vehicle system can prompt the user to select a trigger for terminating a temporary pairing period during which the user device and the vehicle system are to be temporarily paired, and the vehicle system can receive selection of the trigger. The user device and the vehicle system can be paired. The vehicle system can receive data associated with the user and can store the data in a vehicle memory. The vehicle system can monitor for activation of the trigger. In response to the trigger being activated, the vehicle system can terminate the temporary pairing period thereby unpairing the user device and the vehicle system and can delete the data from the vehicle memory.

21 Claims, 16 Drawing Sheets

(56) References Cited

U.S. PATENT DOCUMENTS

| | | |
|---|---|---|
| 8,594,571 B2 | 11/2013 | Jougit |
| 9,104,537 B1 | 8/2015 | Penilla et al. |
| 9,108,579 B2 | 8/2015 | Camacho et al. |
| 9,129,336 B2 | 9/2015 | Ehrman |
| 9,184,777 B2 | 11/2015 | Esselink et al. |
| 9,189,900 B1 | 11/2015 | Penilla et al. |
| 9,193,277 B1 | 11/2015 | Penilla et al. |
| 9,215,274 B2 | 12/2015 | Penilla et al. |
| 9,229,623 B1 | 1/2016 | Penilla et al. |
| 9,285,944 B1 | 3/2016 | Penilla et al. |
| 9,307,410 B2 | 4/2016 | Smereka et al. |
| 9,308,879 B2 | 4/2016 | Wright et al. |
| 9,348,492 B1 | 5/2016 | Penilla et al. |
| 9,372,607 B1 | 6/2016 | Penilla et al. |
| 9,373,201 B2 | 6/2016 | Jefferies et al. |
| 9,423,937 B2 | 8/2016 | Penilla et al. |
| 9,426,225 B2 | 8/2016 | Penilla et al. |
| 9,440,605 B2 | 9/2016 | Vadgama et al. |
| 9,467,515 B1 | 10/2016 | Penilla et al. |
| 9,488,982 B2 | 11/2016 | Gurin |
| 9,499,128 B2 | 11/2016 | Reh et al. |
| 9,499,129 B1 | 11/2016 | Penilla et al. |
| 9,509,775 B2 | 11/2016 | Cuddihy et al. |
| 9,536,197 B1 | 1/2017 | Penilla et al. |
| 2003/0212480 A1 | 11/2003 | Lutter et al. |
| 2004/0199303 A1 | 10/2004 | Ohmura et al. |
| 2004/0249663 A1 | 12/2004 | Shishido |
| 2005/0060070 A1 | 3/2005 | Kapolka et al. |
| 2005/0065678 A1 | 3/2005 | Smith et al. |
| 2006/0090038 A1 | 4/2006 | Jung et al. |
| 2009/0055936 A1 | 2/2009 | Eberstaller |
| 2009/0287499 A1 | 11/2009 | Link, II |
| 2010/0094482 A1 | 4/2010 | Schofield et al. |
| 2011/0313893 A1 | 12/2011 | Weik, III |
| 2012/0015605 A1* | 1/2012 | Sole ............ H04W 12/06 455/41.3 |
| 2013/0117857 A1 | 5/2013 | Zimmermann |
| 2014/0129113 A1 | 5/2014 | Van Wiemeersch et al. |
| 2014/0129301 A1 | 5/2014 | Van Wiemeersch et al. |
| 2014/0156110 A1 | 6/2014 | Ehrman |
| 2014/0156138 A1 | 6/2014 | Klaff et al. |
| 2014/0179234 A1* | 6/2014 | Lee ............ H04W 76/023 455/41.2 |
| 2014/0181989 A1 | 6/2014 | Sako et al. |
| 2014/0222298 A1 | 8/2014 | Gurin |
| 2014/0227980 A1 | 8/2014 | Esselink et al. |
| 2014/0247348 A1 | 9/2014 | Moore, Jr. et al. |
| 2014/0256260 A1* | 9/2014 | Ueda ............ H04W 76/023 455/41.2 |
| 2014/0303837 A1 | 10/2014 | Tuukkanen |
| 2014/0342726 A1 | 11/2014 | Smereka et al. |
| 2015/0019304 A1 | 1/2015 | Vakili |
| 2015/0040203 A1 | 2/2015 | Qian |
| 2015/0166007 A1 | 6/2015 | Hong |
| 2015/0370253 A1 | 12/2015 | Gurin |
| 2016/0042423 A1 | 2/2016 | Henry |
| 2016/0094699 A1 | 3/2016 | Shaout et al. |
| 2016/0126995 A1 | 5/2016 | Li |
| 2016/0295349 A1 | 10/2016 | George |
| 2016/0316363 A1 | 10/2016 | Li |
| 2016/0366538 A1* | 12/2016 | Agarwal ............ H04W 4/008 |
| 2017/0039668 A1 | 2/2017 | Luke et al. |
| 2017/0046533 A1 | 2/2017 | Retter et al. |
| 2017/0134888 A1* | 5/2017 | Innes ............ H04W 4/008 |

FOREIGN PATENT DOCUMENTS

| | | |
|---|---|---|
| WO | WO 2016000014 | 1/2016 |
| WO | WO 2016054010 | 4/2016 |
| WO | WO 2016096307 | 6/2016 |
| WO | WO 2016142816 | 9/2016 |

OTHER PUBLICATIONS

Akalu et al., "Paving the Way for Intelligent Transport Systems (ITS): The Privacy Implications of Vehicular Infotainment Platforms," project for University of Ontario Institute of Technology, Mar. 31, 2016.

Harrop, Catherine, "Digital dirt: Why the data you leave in a rental car could threaten your privacy," CBC News, cbcnews.ca, Jan. 26, 2017.

Rebro, Dave, "Rental Car Bluetooth Dangers—What You Should Know," LinkedIn, linkedin.com, Nov. 20, 2015.

IVe, "Infotainment and Vehicle System Forensics," Berla 2015, retrieved from https://berla.co/products/ive/ on Jul. 28, 2017.

Bialoglowy, Marek, "Bluetooth Security Review, Part 1," Apr. 24, 2005, retrieved at https://www.symantec.com/connect/articles/bluetooth-security-review-part-1 on Jul. 28, 2017.

Chen et al., "Audio streaming over Bluetooth: an adaptive ARQ timeout approach," Proceedings of the $24^{th}$ International Conference on Distributed Computing Systems Workshops, Mar. 23-24, 2004, pp. 196-201.

Berghel, Hal, "Phishing mongers and posers," Communications of the ACM, Apr. 2006, vol. 49, Issue 4, pp. 21-25.

Laurie et al., "Serious flaws in Bluetooth security lead to disclosure of personal data," Nov. 11, 2003, AL Digital, Ltd., retrieved at http://seclists.org/risks/2003/q4/10 on Jul. 28, 2017.

Leung et al., "The security challenges for mobile ubiquitous services," Information Security Technical Report, Jun. 2007, vol. 12, Issue 3, pp. 162-171.

Loo, Alfred WaiSing, "Technical Opinion: Security Threats of Smart Phones and Bluetooth," Communications of the ACM, Mar. 2009, vol. 52, No. 3, pp. 150-150.

Rathi, Sailesh, "Blue Tooth Protocol Architecture," Dedicated Systems Magazine, 2000, Q4, pp. 28-33, http://www.dedicated-systems.com.

Bluetooth SIG, Inc., "Bluetooth SIG Improves User Experience," retrieved at https://www.bluetooth.com/news/pressreleases/2007/03/27/bluetooth-sig-improves-user-experience on Jul. 28, 2017.

Shaked et al., "Cracking the Bluetooth PIN," Proceedings of the $3^{rd}$ International Conference on Mobile Systems, Applications, and Services, Jun. 6-8, 2005, pp. 39-50, USENIX Association.

Zetter, K., "Security Cavities Ail Bluetooth," Aug. 6, 2004, wired.com.

Zhu et al., "A Social Network Based Patching Scheme for Worm Containment in Cellular Networks," Handbook of Optimization in Complex Networks, pp. 505-533.

* cited by examiner

TEMPORARY BLUETOOTH PAIRING

BACKGROUND

Internet of Things (IoT) refers to the networked interconnection of physical things. IoT has amplified the ubiquity of the Internet by integrating embedded systems into everyday life, leading to a highly-distributed network of devices connecting with human beings as well as other devices. IoT creates the ability for physical objects to remotely interact via the Internet. In recent years, IoT has gained much attention around the world. The connection of physical objects to the Internet makes it possible to remotely access sensor data and to control the physical world from a distance. IoT devices utilize a number of communication protocols to provide connectivity among devices. BLUETOOTH technology has emerged as a preferred communication protocol for many IoT applications, including home and automobile.

Mobile devices, such as smartphones, typically feature built-in BLUETOOTH modules that allow users to "pair" with other BLUETOOTH devices. Paired BLUETOOTH devices communicate over an unlicensed, globally available short-range frequency band of 2.4 GHz. BLUETOOTH technology can link devices in close proximity (e.g., a few inches) to over 100 meters at speeds that vary depending on the BLUETOOTH device class and BLUETOOTH version.

Although Bluetooth facilitates effortless connections to vast amounts of information, users are not aware that the technology is vulnerable to a wide variety of security threats such as denial of service ("DoS") attacks, eavesdropping, man-in-the-middle attacks, message modification, and resource misappropriation. BLUETOOTH popularity has given rise to a series of security risks known as bluejacking, bluebugging, and bluesnarfing. In bluejacking, a nefarious person discovers and anonymously sends a business card to another BLUETOOTH device. Bluebugging is more serious, which allows another BLUETOOTH user connectivity to issue commands on a remote mobile phone, such as to make calls, send SMS text messages, or even eavesdrop on conversations. Bluesnarfing allows a BLUETOOTH user connectivity to other devices within range in order to gain access to other user's contacts, address books, calendar, and more. As users store more personal information on BLUETOOTH-enabled devices, the need to address potential security and privacy threats becomes more pressing.

Every technology has its weaknesses. With the proliferation of IoT devices, security continues to be an afterthought to the desirability of devices that are constantly connected. The age of connectedness using mobile phones increases certain risks using BLUETOOTH and smart phones. Most of the existing threats come from the ignorance of users and improper security implementation by some manufacturers. There are weaknesses in the current BLUETOOTH standards, particularly for implementations with connected cars. Most security threats, however, are due to improper implementation by manufacturers.

Actual attack artifacts, for example, malware, SMS or network-based attacks, tend to become unique. This is problematic for security tools, which sometimes use the observation of the same suspicious artifact in multiple locations as an indication of maliciousness, and for security companies, which may prioritize the investigation of novel attacks and artifacts based on their prevalence. These same security tools used to detect maliciousness can be used by hackers intentionally to cause harm to the unsuspecting user.

A widely-known security tool such as Infotainment and Vehicle System Forensics ("iVe") can be used against vehicles that leave embedded BLUETOOTH personal information. iVe is a vehicle system forensic tool that acquires user data from vehicles, and allows forensic examiners and investigators to analyze the user data. Vehicle infotainment systems store a vast amount of the user-related data, including, for example, recent destinations, favorite locations, call logs, contact lists, SMS messages, emails, pictures, videos, and the navigation history of the vehicle. iVe directly interfaces with vehicle systems via specially-designed hardware to acquire a full or partial binary image and decode the data. It also has the capability to recover deleted information from either image types. iVe can decode and parse data such as vehicle information, device information, navigation data, and vehicle events. There are a vast number of available security forensic tools ranging from standalone packages to complex integrated tools. These very tools, although initially developed for criminal investigations, are also used by hackers to commit crimes.

Most of the security problems related to computers are also valid for IoT smart phones and connected cars. As phones and other IoT devices have been equipped with more functions, more security issues arise. Most users do not recognize the serious consequences of leaving their BLUETOOTH device or contact lists synced in publicly accessible vehicles.

SUMMARY

Concepts and technologies disclosed herein are directed to temporary BLUETOOTH pairing. According to one aspect of the concepts and technologies disclosed herein, a vehicle system can prompt a user to select a pairing type from a group of available pairing types for pairing a user device with the vehicle system via BLUETOOTH. The group of available pairing types can include a normal BLUETOOTH pairing type and a temporary BLUETOOTH pairing type. The vehicle system can receive, from a user, selection of the temporary BLUETOOTH pairing type from the group of available pairing types. In response to receiving selection of the temporary BLUETOOTH pairing type, the vehicle system can prompt the user to select a trigger for terminating a temporary pairing period during which the user device and the vehicle system are to be temporarily paired. The user device and the vehicle system can be paired via BLUETOOTH. The vehicle system can receive, from the user device, data associated with the user. The vehicle system can store, in a vehicle memory associated with the vehicle system, the data associated with the user. The vehicle system can monitor for activation of the trigger. In response to the trigger being activated, the vehicle system can terminate the temporary pairing period thereby unpairing the user device and the vehicle system. The vehicle system also can delete, from the vehicle memory, the data associated with the user.

In some embodiments, the trigger is or includes a temporary pairing time selected from a number of pre-set times, such as one or more days, or custom-defined by the user in any unit of time, such as minutes, hours, days, weeks, month, and/or years. In some other embodiments, the trigger is or includes a temporary pairing time that automatically expires when a vehicle associated with the vehicle system is powered off. This embodiment is particularly useful for scenarios in which a vehicle dealer or other entity wants to demonstrate to the user features of the vehicle, including pairing the user device with the vehicle system to demonstrate, for example, how the vehicle system can receive from the user device the user's contact list for use as part of the vehicle system's hands-free calling feature. In other embodiments, the trigger is or includes a scan by a vehicle scanning device. For example, when the vehicle is returned to a vehicle/rental sharing service or the vehicle is inventoried by a vehicle dealer after sale, lease turn-in, vehicle demonstration (e.g., test drive), or courtesy vehicle return to the vehicle dealer, the vehicle dealer can use the vehicle scanning device to scan the vehicle. The vehicle scanning device can establish a BLUETOOTH connection with the vehicle system and can instruct the vehicle system to delete the data from the vehicle memory.

In some embodiments, the vehicle system can set an idle-time backup trigger that specifies a maximum idle time between BLUETOOTH connections among the user device and the vehicle system. Upon expiration of the maximum idle time, the vehicle system can delete, from the vehicle memory, the data associated with the user.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
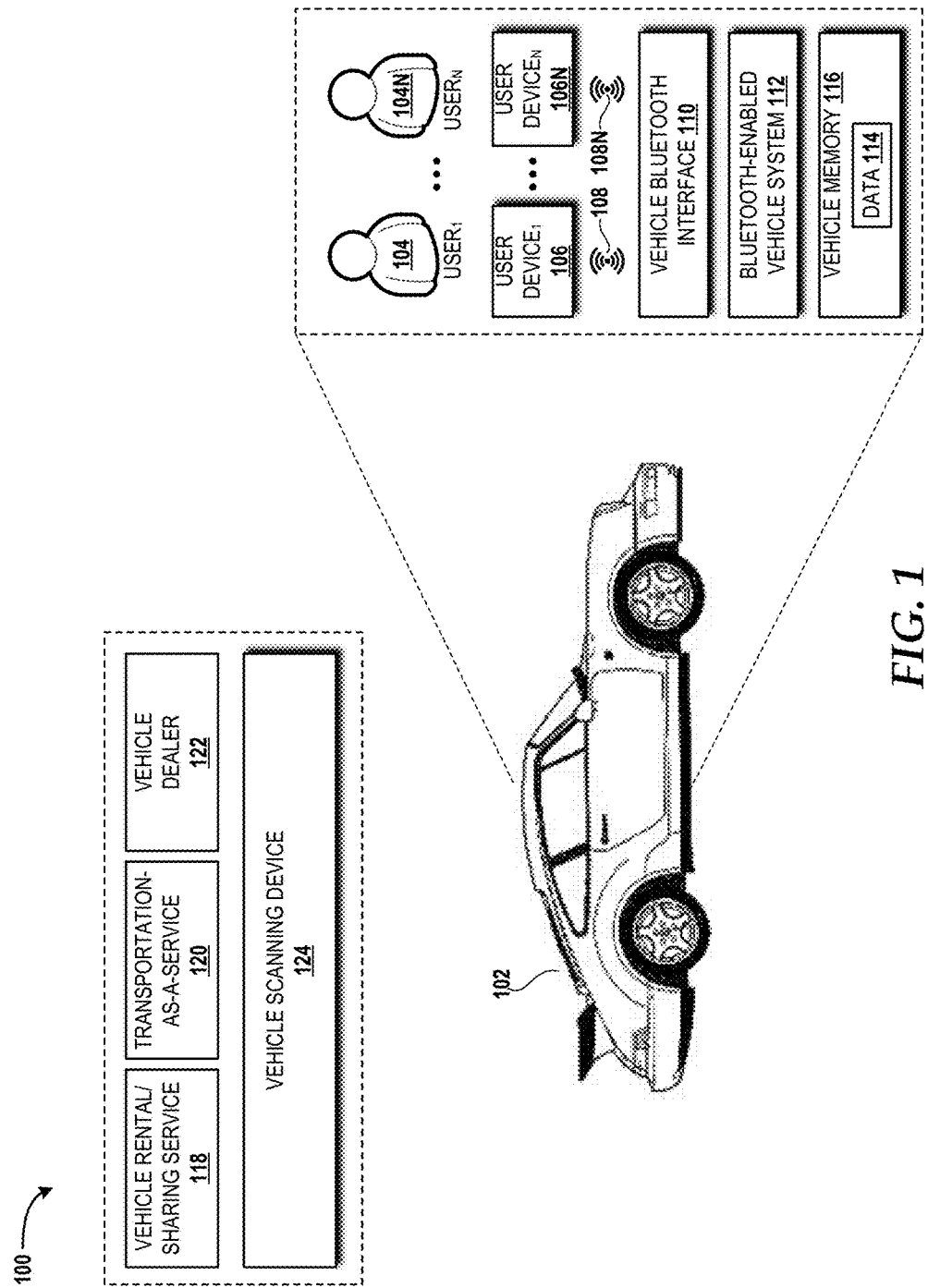
FIG. 1 is a block diagram illustrating aspects of an illustrative operating environment for various concepts disclosed herein.

IoT devices allow users to be connected anytime and anywhere. In many places around the world, conversing on a cell phone while driving is against the law. Therefore, the need to talk on the phone hands-free has become a necessity. Car rental/sharing companies allow people to rent/share cars, and many of these cars are equipped with BLUETOOTH connectivity. The ability to pair their cell phone is attractive to customers who make only occasional use of a vehicle, as well as others who would like occasional access to a vehicle of a different type than they use day-to-day. The organization renting the cars may be a commercial business or the users may be business or leisure renters. The auto dealership industry on the other hand, acquires previously owned vehicles from many different outlets, including your typical owner trade-ins and previously used rental vehicles. Whether a vehicle is being rented or purchased by a consumer, previous BLUETOOTH pairings can leave embedded BLUETOOTH information predisposed to security threats.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including hand-held devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of temporary BLUETOOTH pairing will be described.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a vehicle 102. The vehicle 102 can be a car, truck, van, motorcycle, moped, go-kart, golf cart, or any other ground-based vehicle. In some embodiments, the vehicle 102 is a driver-operated vehicle. In some embodiments, the vehicle 102 is capable of operating in at least a partially autonomous control mode. In some embodiments, the vehicle 102 can be a fully autonomous vehicle. In some embodiments, the vehicle 102 can operate as a Level 3 or Level 4 vehicle as defined by the National Highway Traffic Safety Administration ("NHTSA"). The NHTSA defines a Level 3 vehicle as a limited self-driving automation vehicle that enables a driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time. The GOOGLE car, available from GOOGLE, is an example of a limited self-driving automation vehicle. The NHTSA defines a Level 4 vehicle as a full self-driving automation vehicle that is designed to perform all safety-critical driving functions and monitor roadway conditions for an entire trip to a destination. Such a design anticipates that the driver will provide destination or navigation input, but is not expected to be available for control at any time during the trip.

The vehicle 102 can accommodate one or more vehicle occupants 104-104N (also referred to herein as "users 104", or in the singular as "user 104"), each of whom can be a driver or a passenger of the vehicle 102 and can be associated with one or more user devices 106-106N (also referred to herein as "user devices 106", or in the singular as "user device 106"). For purposes of simplified explanation, the vehicle 102 will be described as accommodating the user 104 as a driver and his or her user device 106. Any number of occupants 104 and user devices 106 are contemplated, and as such, the illustrated example should not be construed as being limiting in any way.

According to various embodiments, the functionality of the user device 106 may be provided by one or more mobile telephones, smartphones, tablet computers, slate computers, smart watches, fitness devices, smart glasses, other wearable devices, mobile media playback devices, set top devices, navigation devices, laptop computers, notebook computers, ultrabook computers, netbook computers, server computers, computers of other form factors, computing devices of other form factors, other computing systems, other computing devices, Internet of Things ("IoT") devices, other unmanaged devices, other managed devices, and/or the like. It should be understood that the functionality of the user device 106 can be provided by a single device, by two or more similar devices, and/or by two or more dissimilar devices.

Each of the user devices 106-106N is configured to communicate with the vehicle 102 over a BLUETOOTH connection 108-108N, respectively. In particular, the user device 106 can utilize a device BLUETOOTH interface (best shown in FIG. 5) to pair with a vehicle BLUETOOTH interface 110 that enables the user device 106 to communicate over the BLUETOOTH connection 108 with a BLUETOOTH-enabled vehicle system 112 (also referred to herein as vehicle system 112) to exchange data 114. The BLUETOOTH-enabled vehicle system 112 can store the data 114 received from the user device 106 in a vehicle memory 116.

The device BLUETOOTH interface of the user device 106 and the vehicle BLUETOOTH interface 110 can each include a hardware component that includes a BLUETOOTH radio and a software component that includes instructions for the hardware component to execute to pair the user device 106 to the vehicle system 112 and to enable and maintain the BLUETOOTH connection 108. The BLUETOOTH connection 108 can be or can include a piconet in which one of the user device 106 and the vehicle system 112 functions as the master and the other as the slave. Once paired, the user device 106 and the vehicle system 112 can establish the BLUETOOTH connection 108 dynamically and automatically when within radio proximity. Those skilled in the art will appreciate the technical details of normal BLUETOOTH pairing and BLUETOOTH connectivity among previously paired devices. As such, additional details in this regard are not provided herein.

The vehicle system 112, in some embodiments, is or includes a hands-free telephone system, a vehicle entertainment system (also commonly referred to as "an infotainment system"), a vehicle navigation system, a vehicle engine control unit ("ECU"), and/or another computing system of the vehicle 102. The vehicle system 112 may be retrofitted into the vehicle 102 as aftermarket equipment or may be made available as standard or optional original equipment manufacturer ("OEM") equipment of the vehicle 102.

The vehicle memory 116 can include, but is not limited to, random access memory ("RAM"), volatile and non-volatile memory devices, semi-permanent or permanent memory types; for example, tape-based media, optical media, flash media, hard disks, combinations thereof, and the like. While the vehicle memory 116 is illustrated as being separate from the vehicle system 112, the vehicle memory 116 can be integrated within the vehicle system 112, and, in some embodiments, can be provided, at least in part, as a removable memory embodied, for example, as a memory card, such as a secure digital card.

The data 114 stored in the vehicle memory 116 can include any data associated with the user 104 and/or the user device 106. The data 114 can include data associated with the user's interaction with the vehicle system 112, such as data 114 shared by the user device 106 with the vehicle system 112 to enable certain functionality of the vehicle system 112. For example, embodied as a hands-free telephone system, the vehicle system 112 might receive from the user device 106, the data 114, including name, address, telephone number, and/or other user identifying information for the user 104 and/or for one or more of the user's 104 contacts. The data 114 can additionally or alternatively include calendar information, photos, videos, other files, email, SMS messages, MMS messages, other message types, social media information, phone call records, web browsing history, application-specific data, passwords, combinations thereof, and the like.

The data 114 stored in the vehicle memory 116 remains stored in the vehicle memory 116 until it is removed through a manually initiated deletion process implemented by the vehicle system 112. For a number of reasons, the user 104 might intentionally or unintentionally fail to initiate the deletion process prior to parting with the vehicle 102. For example, the user 104 might have rented the vehicle 102 or otherwise used the vehicle 102 as part of a vehicle sharing service (shown collectively as vehicle rental/sharing service 118) and might have paired the user device 106 with the vehicle system 112 to take advantage of its features, and upon returning the vehicle 102 to the vehicle rental/sharing service 118, the user 104 might not delete the data 114 stored in the vehicle memory 116. When the vehicle 102 is then rented/shared with other users, the data 114 associated with the user 104 might be exposed. As the vehicle 102 is rented/shared with other users and these users pair their user devices with the vehicle system 112, the vehicle memory 116 might obtain their data and, over time, the user's 104 data 114 will likely be exposed to several other people. While many people would disregard the data 114, it is possible that some people might take advantage of the data 114 for nefarious endeavors such as identity theft, device cloning, or selling the data 114 for profit, or for potentially far worse, such as to seek out the home or work place of a previous user with the intent to cause harm to that user and/or their family. In addition to vehicle rental/sharing services 118, the vehicle 102 might be part of a taxi service or other transportation-as-a-service 120 offering, including, for example, UBER and LYFT. As a transportation-as-a-service 120 vehicle, the vehicle 102 might be exposed to far more users 104, and as a result, the volume of data collected from these users only exacerbates the problems described above. As another example, the user 104 might own or lease the vehicle 102 and might sell the vehicle 102 to a vehicle dealer 122 or might return the vehicle 102 upon expiration of a lease agreement. The vehicle dealer 122 might be unfamiliar with the deletion process required by certain makes and/or models of vehicles, and so might resell the vehicle 102 to another and/or might facilitate test drives during which features of the vehicle system 112 are demonstrated to the prospective buyer/leaser, including pairing the prospective buyer/leaser's device with the vehicle system 112, thereby storing in the vehicle memory 116 potentially sensitive data associated with the prospective buyer/leaser and/or his or her device. The vehicle 102 might be used in other ways by the vehicle dealer 122, including as a designated demonstration vehicle for test drives or a courtesy vehicle when a customer drops their own vehicle off for service.

The user 104 can enable a temporary pairing feature whereby the vehicle system 112 automatically deletes the data 114 from the vehicle memory 116 in response to a trigger that can be set by the user 104. In some embodiments of the concepts and technologies disclosed herein, the trigger is or includes a temporary pairing time selected from a number of pre-set times, such as one or more days, or custom-defined by the user 104 in any unit of time, such as minutes, hours, days, weeks, month, and/or years. An example GUI showing a temporary pairing time selected by the user 104 as the trigger for the vehicle system 112 to automatically delete the data 114 from the vehicle memory 116 is shown in FIG. 2F, described below. In some other embodiments, the trigger is or includes a temporary pairing time that automatically expires when the vehicle 102 is powered off. An example GUI showing a temporary pairing time based upon the vehicle 102 being powered off is shown in FIG. 2G, described below. This embodiment is particularly useful for scenarios in which the vehicle dealer 122 wants to demonstrate to the user 104 features of the vehicle 102, including pairing the user device 106 with the vehicle 102 to demonstrate, for example, how the vehicle system 112 can receive from the user device 106 the user's 104 contact list for use as part of the vehicle system's 112 hands-free calling feature. In other embodiments, the trigger is or includes a scan by a vehicle scanning device 124. For example, when the vehicle 102 is returned to the vehicle/rental sharing service 118 or the vehicle is inventoried by the vehicle dealer 122 after sale, lease turn-in, vehicle demonstration (e.g., test drive), or courtesy vehicle return to the vehicle dealer 122, the vehicle dealer 122 can use the vehicle scanning device 124 to scan the vehicle 102. The vehicle scanning device 124 can establish a BLUETOOTH connection with the vehicle system 112 via the vehicle BLUETOOTH interface 110 and can instruct the vehicle system 112 to delete the data 114 from the vehicle memory 116.

It should be understood that some implementations of the operating environment 100 can include a different number of vehicles 102, users 104, user devices 106, BLUETOOTH connections 108, vehicle BLUETOOTH interfaces 110, vehicle systems 112, data 114, vehicle memory 116, vehicle rental/sharing services 118, transportation-as-a-service offerings 120, vehicle dealers 122, and/or vehicle scanning devices 124 than shown in the illustrated embodiment. Thus, the illustrated embodiment should be understood as being illustrative, and should not be construed as being limiting in any way.

FIGS. 2A-2J are GUI diagrams of exemplary user interfaces for implementing aspects of the concepts and technologies disclosed herein, according to illustrative embodiments. The colors, shapes, fonts, graphics, images, and other design elements of the GUI diagrams are intended merely as examples to aid in explanation of some features disclosed herein. Accordingly, the design of the GUI diagrams should not be construed as being limiting in any way.

Figure 2A:
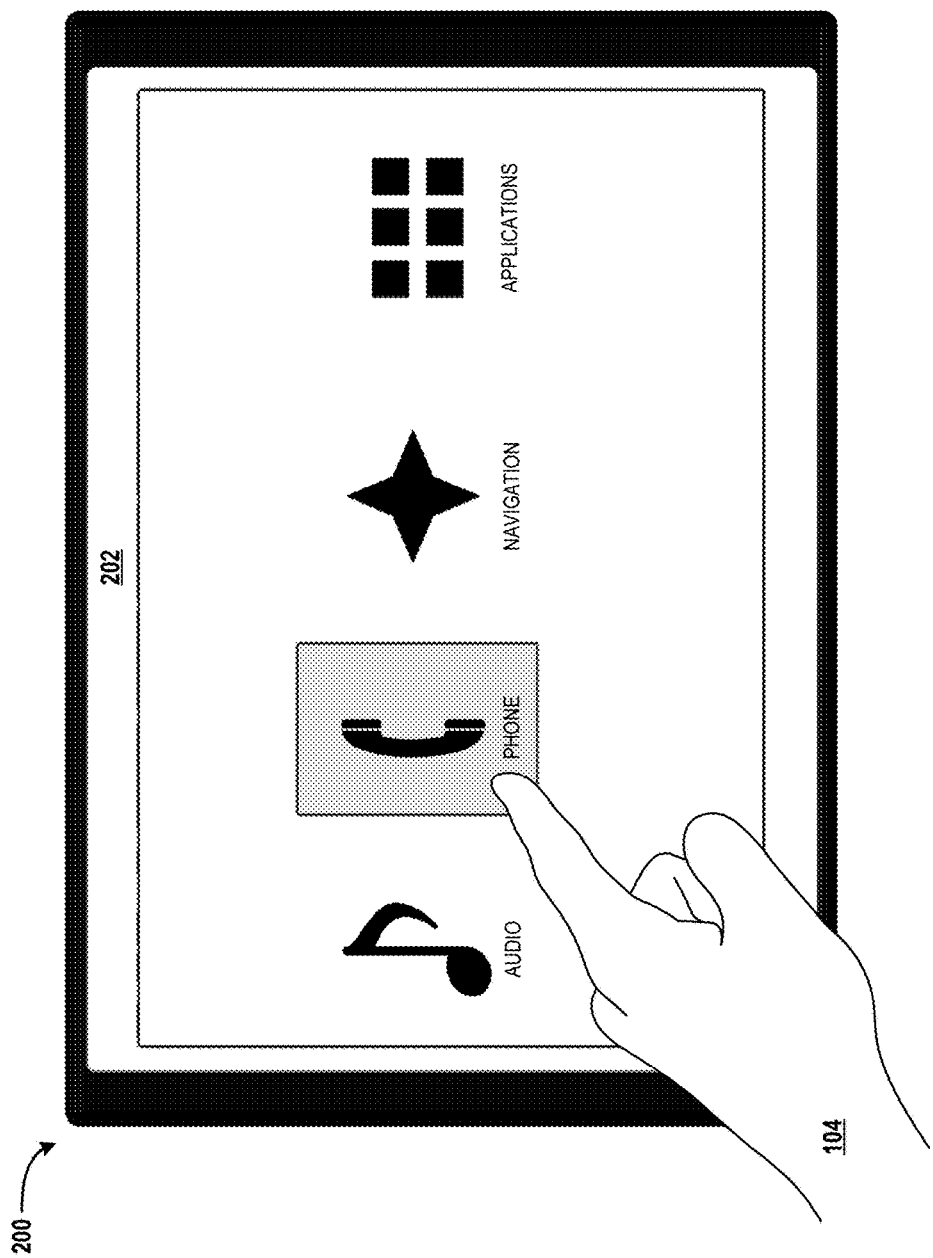
FIGS. 2A-2J are graphical user interface ("GUI") diagrams illustrating aspects of exemplary user interfaces, according to an illustrative embodiment of the concepts and technologies disclosed herein.
Figure 2B:
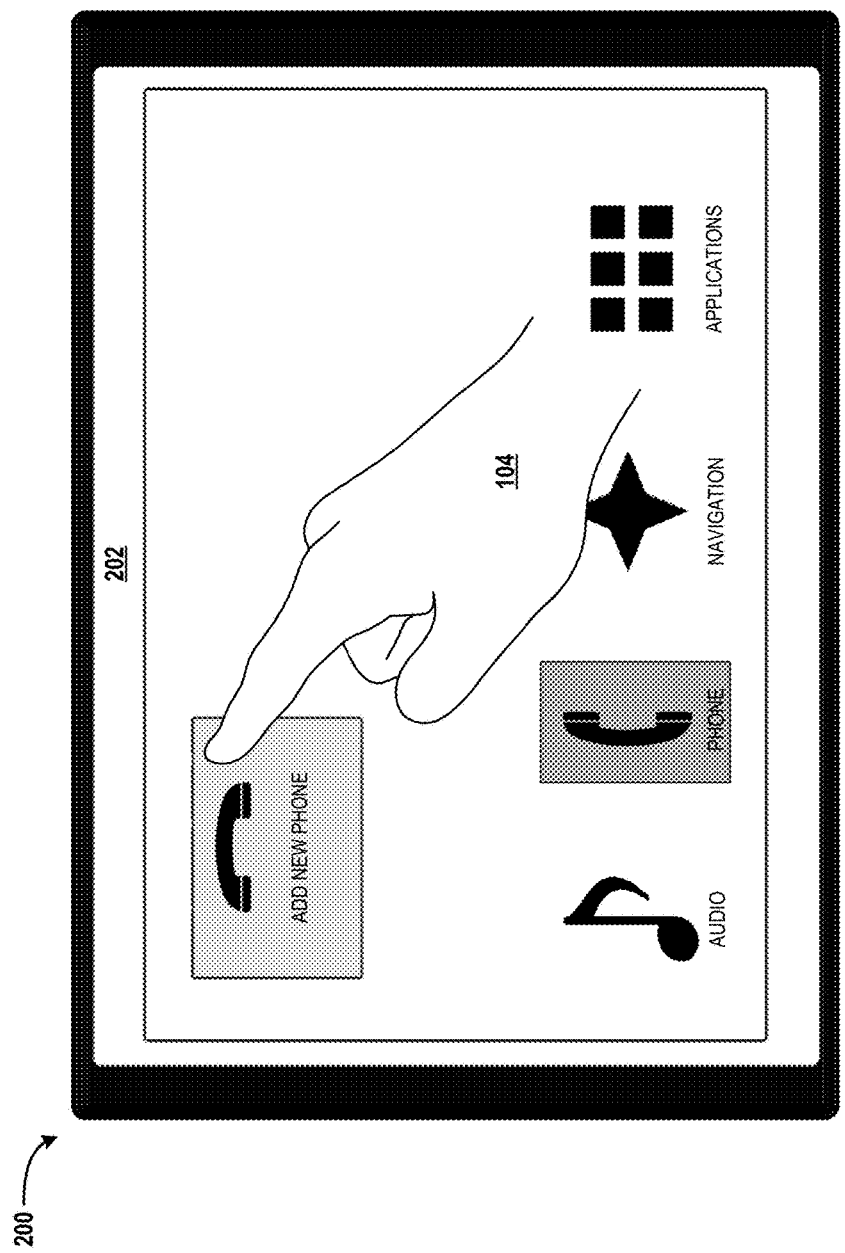
Figure 2C:
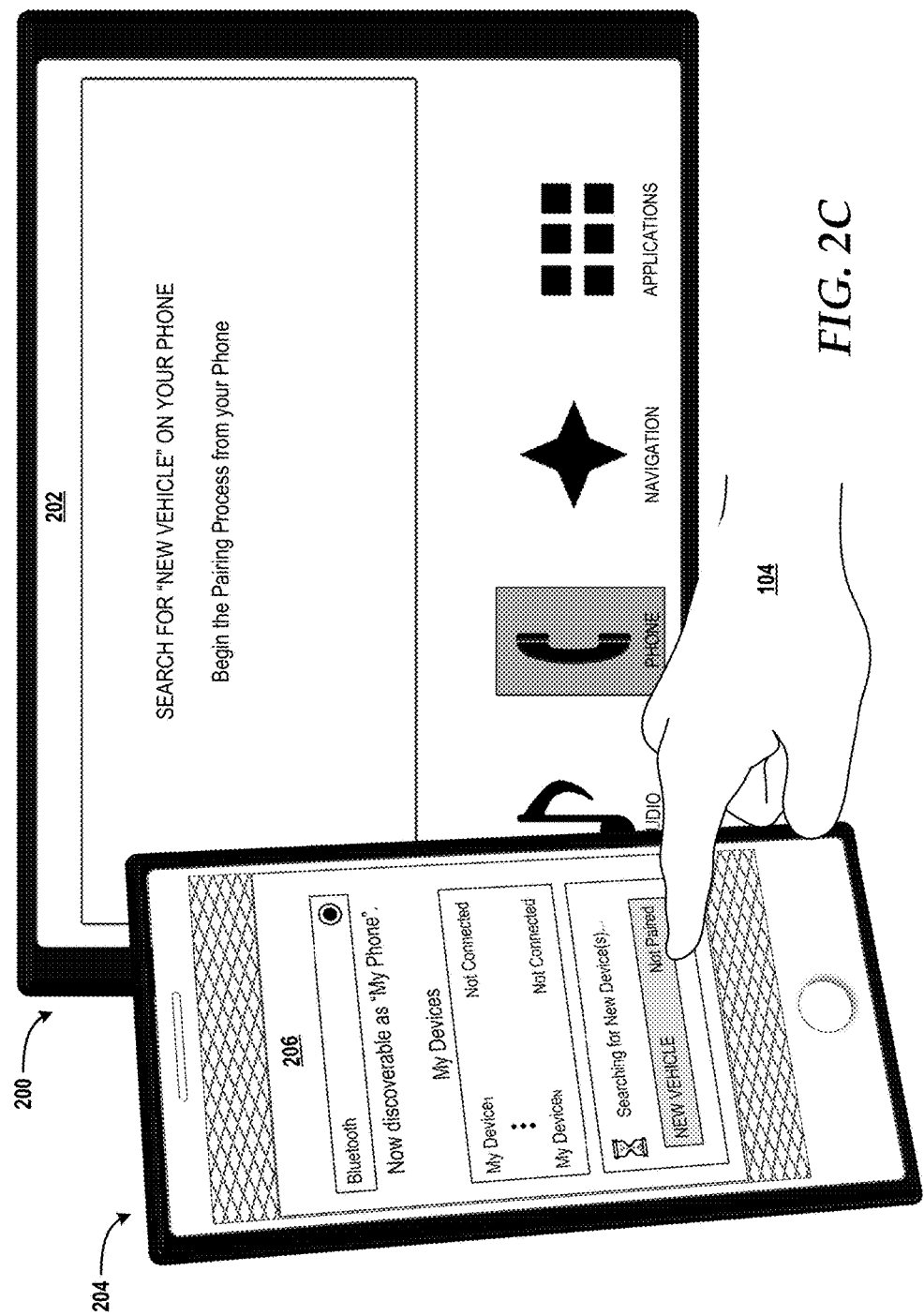

Turning first to FIG. 2A, a vehicle system display 200 of the vehicle system 112 is shown. In the illustrated example, the vehicle system display 200 presents a vehicle system GUI 202 that includes icons representative of some functions offered by the vehicle system 112. The illustrated icons include audio, phone, navigation, and applications. It should be understood that the functions represented via the illustrated icons should not be construed as limiting in any way the functions that can be provided by the vehicle system 112 disclosed herein. The user 104 is shown selecting the phone icon, and in response, the vehicle system GUI 202 presents an "Add New Phone" icon as shown in FIG. 2B in which the user 104 is shown selecting the "Add New Phone" icon. In response to receiving the selection of the "Add New Phone" icon, the vehicle system GUI 202 presents, as shown in FIG. 2C, a message asking the user 104 to search for a vehicle identifier "New Vehicle" on their phone (in this case the user device 106). FIG. 2C also shows a user device display 204 of the user device 106. In the illustrated example, the user device display 204 presents a user device GUI 206. The user device GUI 206 includes a radio button that allows the user 104 to enable/disable BLUETOOTH functionality on the user device 106. The user device GUI 206 also includes a list of devices with which the user device 106 is currently paired but not connected. In the illustrated example, the user 104 is shown selecting the vehicle identifier—"New Vehicle"—from a list of new devices the user device 106 has found.

Figure 2D:
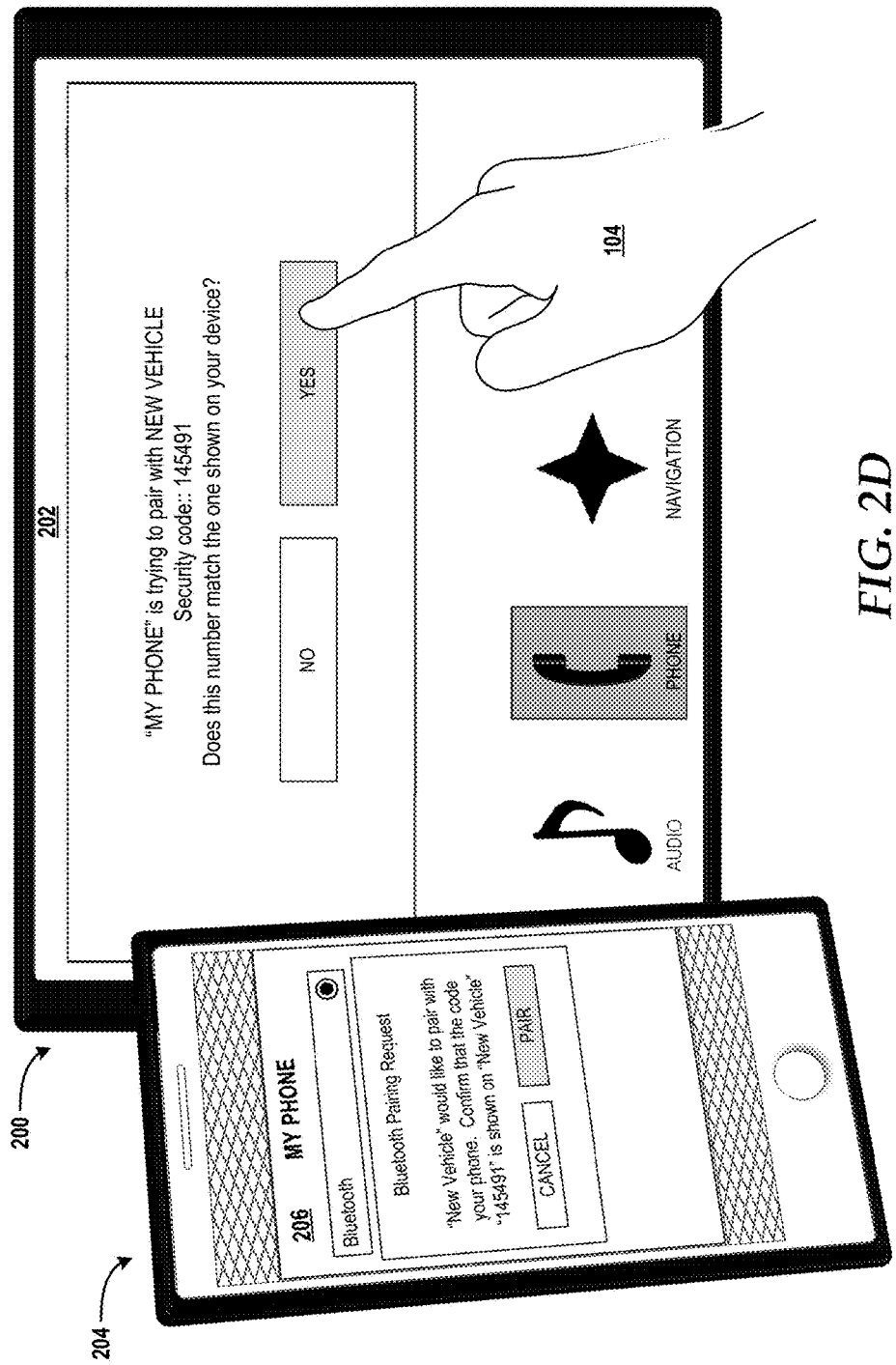

Turning to FIG. 2D, the vehicle system GUI 202 presents a message to notify the user 104 that user device identifier "My Phone", which is representative of the user device 106, is trying to pair with the vehicle system 112. In the illustrated embodiment, a passkey is shown represented as a six digit security code, although other passkey types known to those skilled in the art are contemplated. The passkey is used to confirm the devices to be paired—that is, the user device 106 and the vehicle system 112 in this example. The user 104 is shown selecting "Yes" to confirm that the security code presented on the vehicle system GUI 202 is the same as the security code presented on the user device GUI 206. Alternatively, the user 104 could have selected "Pair" from the user device GUI 206 to proceed to the next screen as represented in FIG. 2E.

Figure 2E:
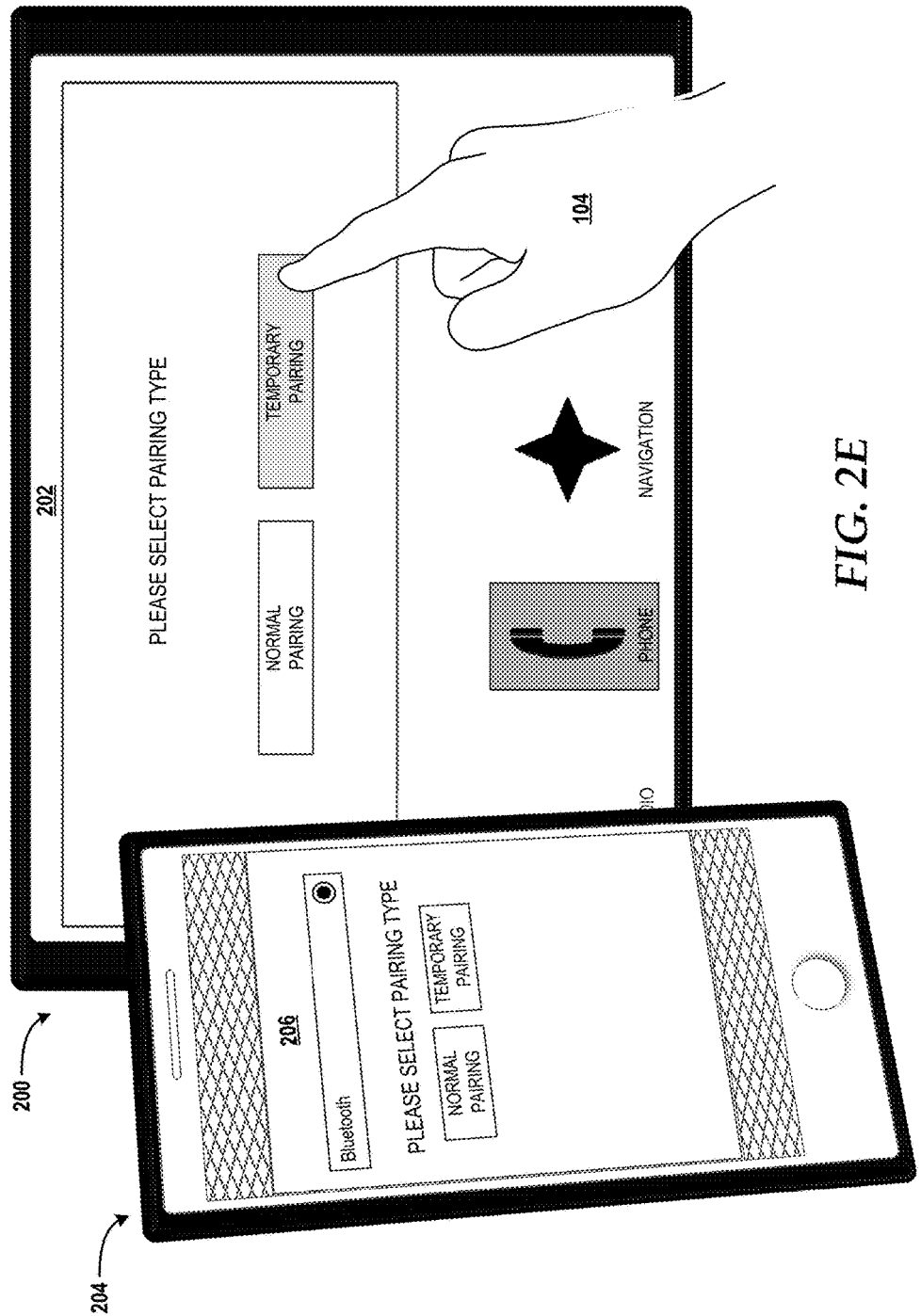
Figure 2F:
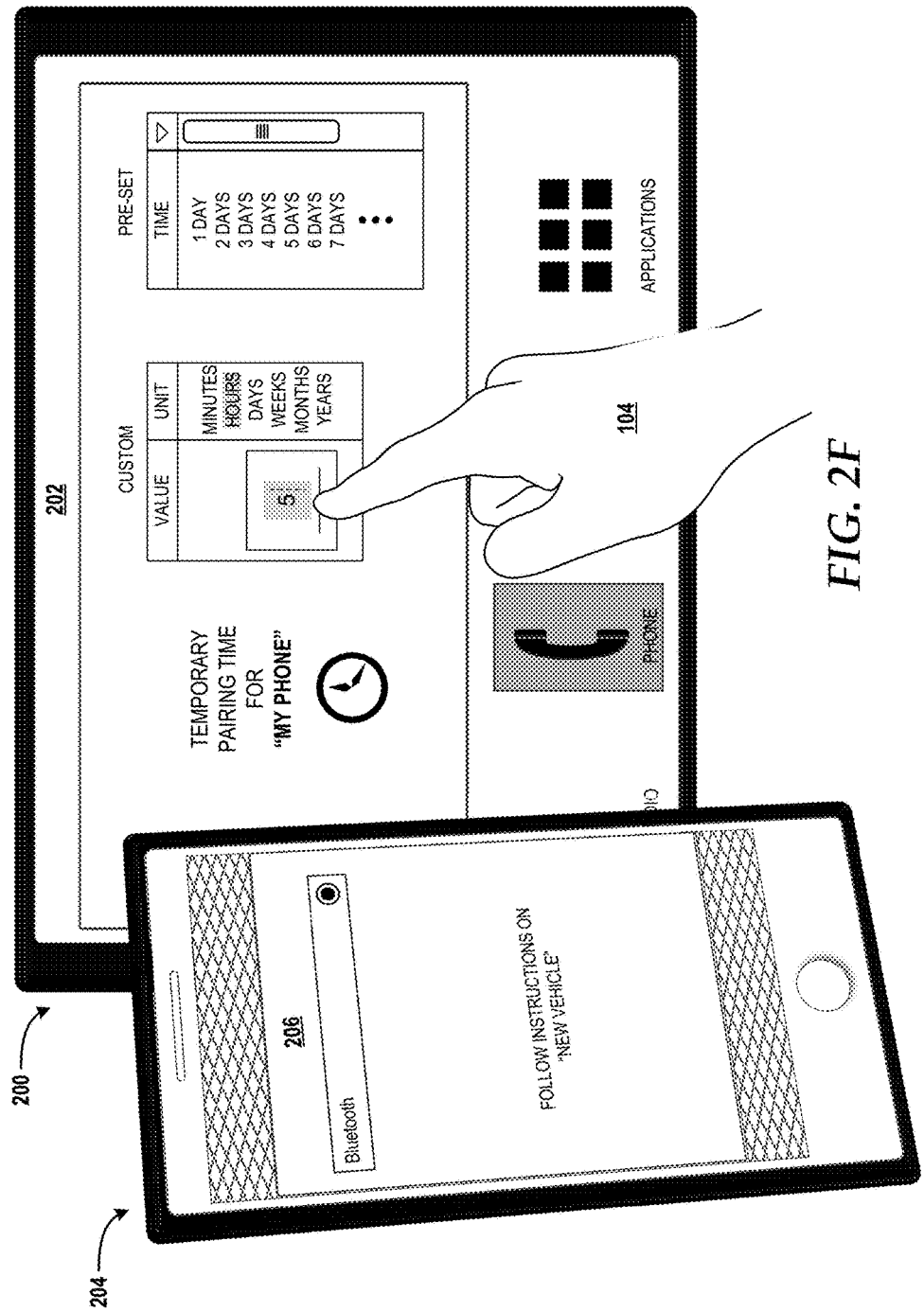
Figure 2G:
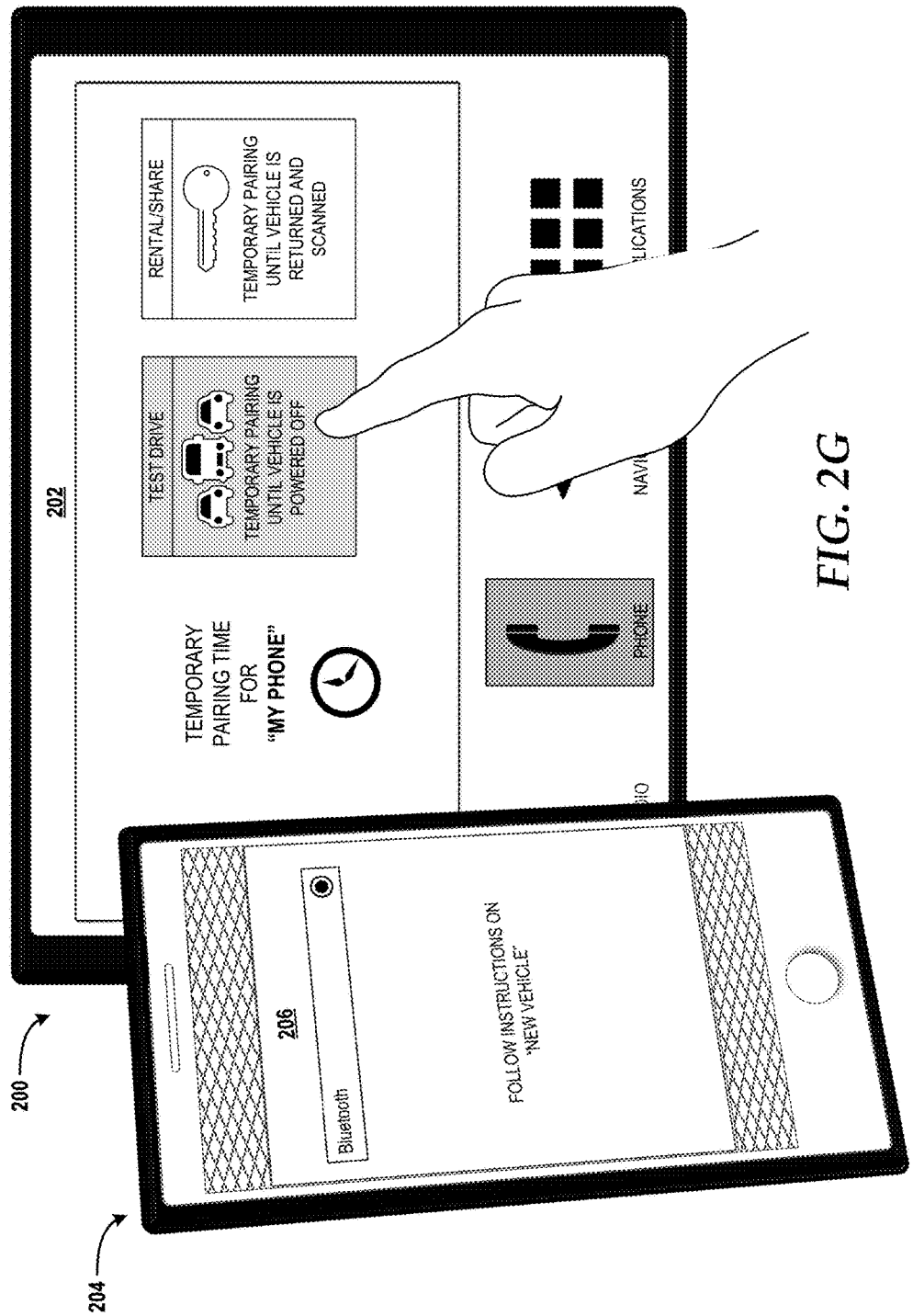

FIG. 2E shows the vehicle system GUI 202 and the user device GUI 206 both presenting a prompt to select a pairing type. The prompt includes selectable options for "Normal Pairing" and "Temporary Pairing" with the "Temporary Pairing" option illustrated as being selected by the user 104 via the vehicle system GUI 202. Alternatively, the user could have selected one of the selectable options via the user device GUI 206. The "Normal Pairing" option instructs the user device 106 and the vehicle system 112 to complete the BLUETOOTH pairing process such that the user device 106 and the vehicle system 112 are paired until manually unpaired. The "Temporary Pairing" option, however, allows the user 104 to enable a temporary pairing feature whereby the vehicle system 112 automatically deletes the data 114 from the vehicle memory 116 in response to a trigger that can be set by the user 104.

Turning now to FIG. 2F, the user device GUI 206 instructs the user 104 to follow the instructions on the "New Vehicle"—that is, the vehicle system GUI 202 on the vehicle system display 200. The vehicle system GUI 202 allows the user 104 to select a temporary pairing time from a number of pre-set times, such as one or more days, or custom-defined by the user 104 in any unit of time, such as minutes, hours, days, weeks, month, and/or years. In another embodiment, the user device GUI 206 might additionally or alternatively present the same or similar options for the user 104 to select a temporary pairing time. In the illustrated example, the user 104 is shown inputting a custom-defined temporary pairing time as "5 hours."

Figure 2H:
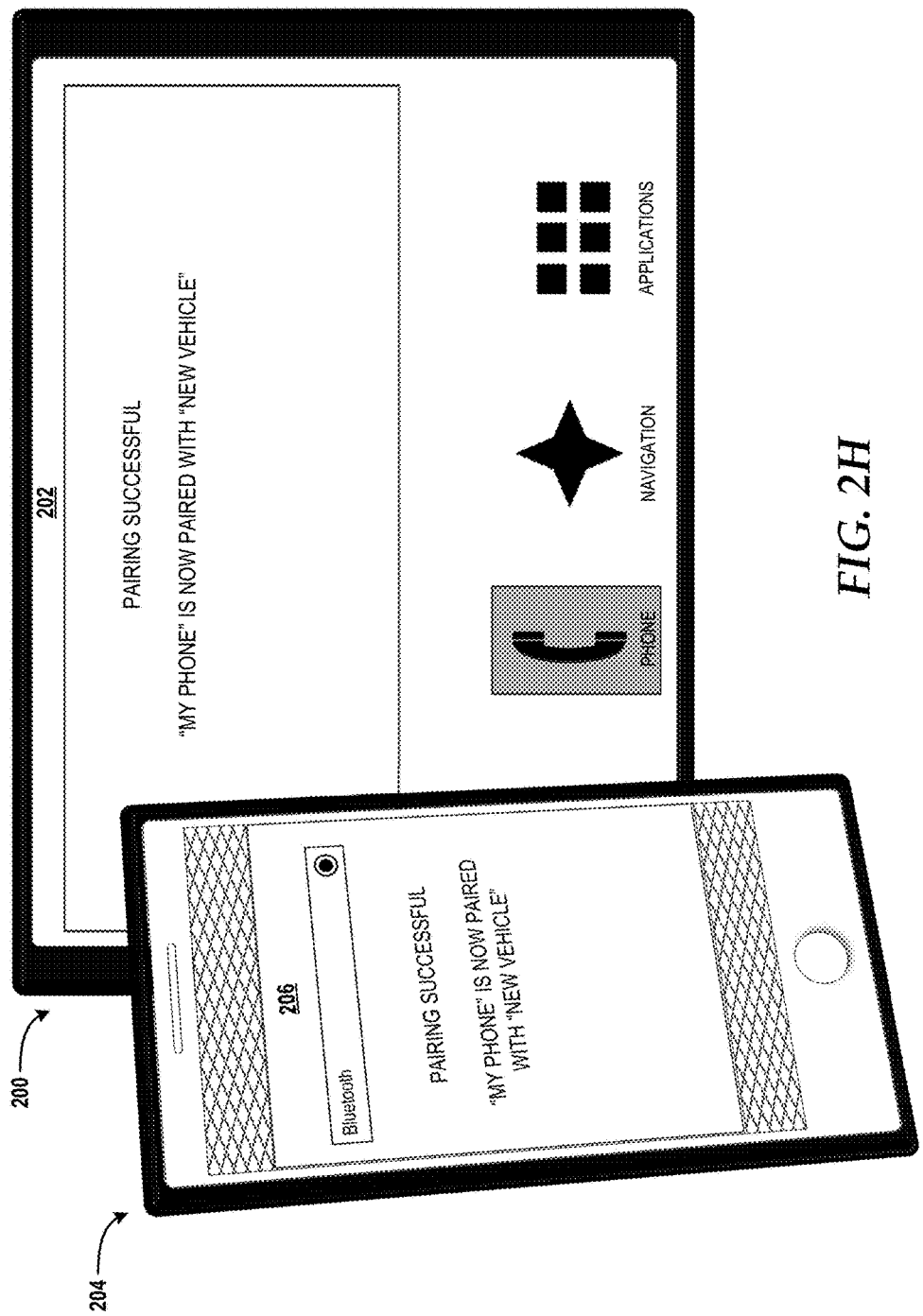

Turning now to FIG. 2G, other options for setting the temporary pairing time are shown. In particular, the vehicle system GUI 202 presents an option to allow temporary pairing of the user device 106 and the vehicle system 112 to automatically expire when the vehicle 102 is powered off. This option is particularly useful for scenarios in which the vehicle dealer 122 wants to demonstrate to the user 104 features of the vehicle 102, including pairing the user device 106 with the vehicle 102 to demonstrate, for example, how the vehicle system 112 can receive from the user device 106 the user's 104 contact list for use as part of the vehicle system's 112 hands-free calling feature. The vehicle system GUI 202 also presents an option to allow temporary pairing of the user device 106 and the vehicle system 112 until the vehicle 102 is returned and scanned, such as, by the vehicle scanning device 124. For example, when the vehicle 102 is returned to the vehicle/rental sharing service 118 or the vehicle is inventoried by the vehicle dealer 122 after sale, lease turn-in, vehicle demonstration (e.g., test drive), or courtesy vehicle return to the vehicle dealer 122, the vehicle dealer 122 can use the vehicle scanning device 124 to scan the vehicle 102. If this option is selected, the vehicle scanning device 124 can establish a BLUETOOTH connection with the vehicle system 112 via the vehicle BLUETOOTH interface 110 and can instruct the vehicle system 112 to delete the data 114 from the vehicle memory 116. In FIG. 2H, the vehicle system GUI 202 and the user device GUI 206 both present a message to inform the user 104 that the pairing was successful.

Figure 2I:
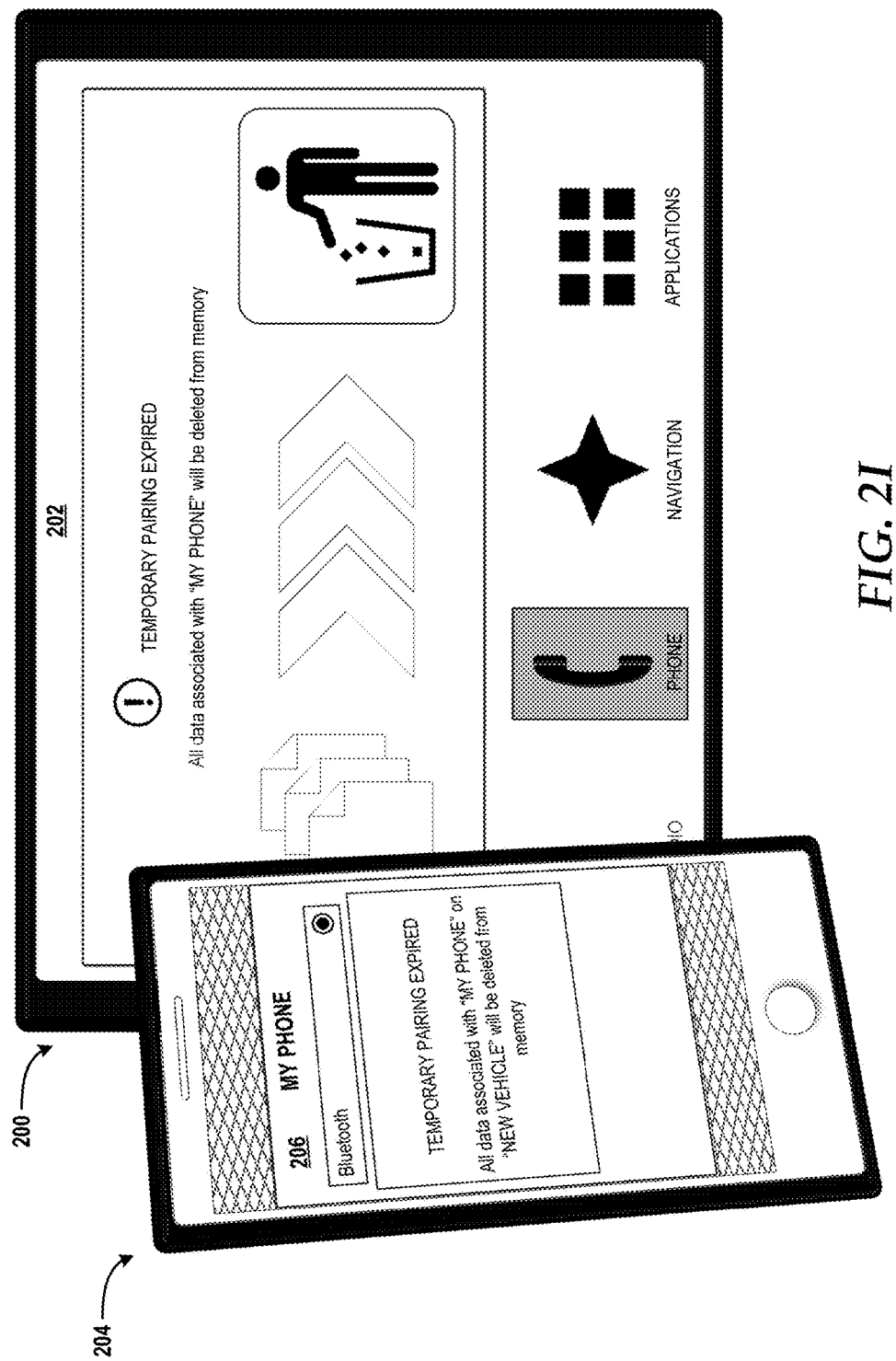
Figure 2J:
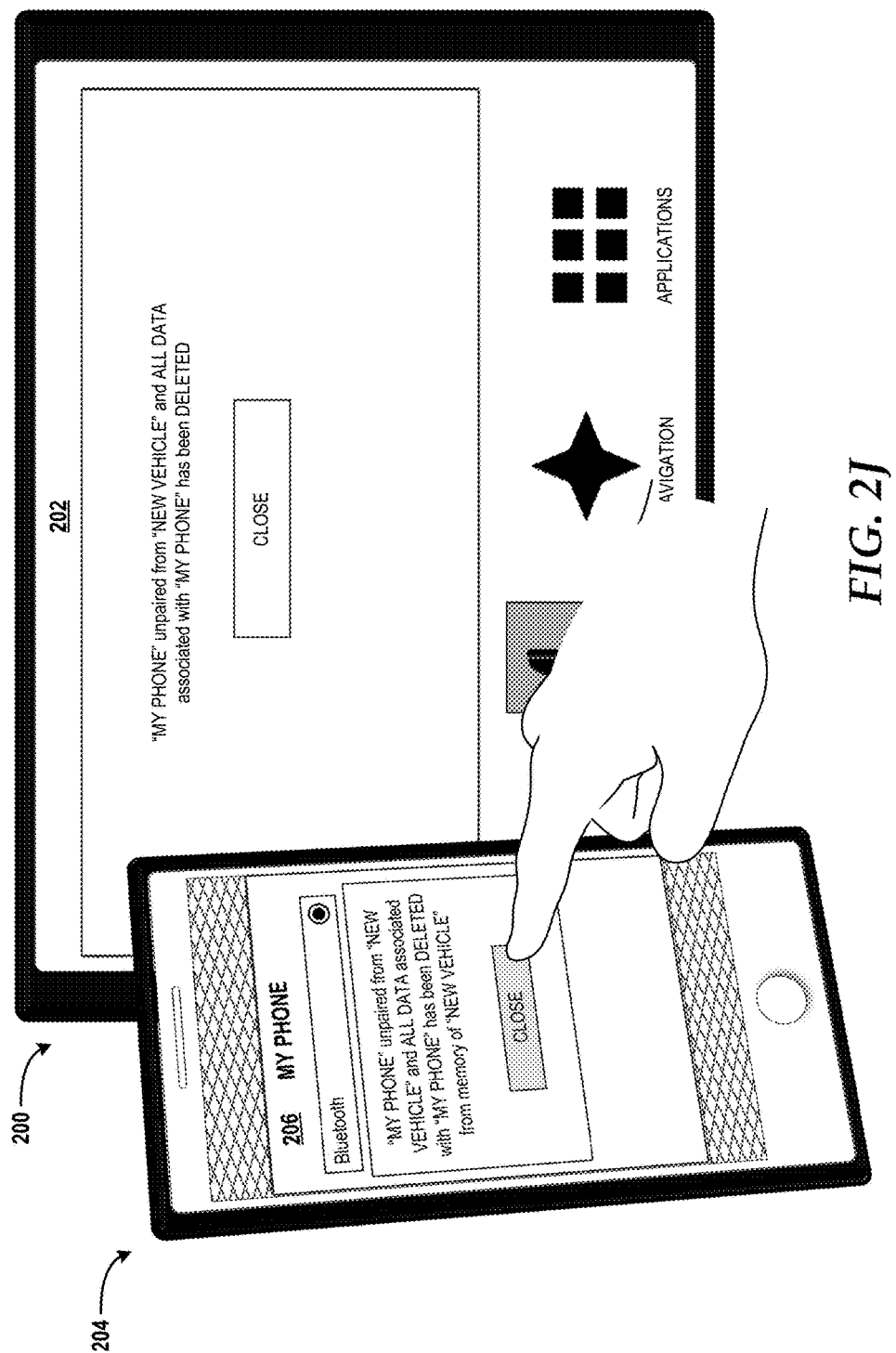

Turning now to FIG. 2I, the temporary pairing time has expired thereby triggering deletion of the data 114 associated with the user 104 and the user device 106. The vehicle system GUI 202 and the user device GUI 206 both notify the user 104 that the data 114 will be deleted, and in FIG. 2J both the vehicle system GUI 202 and the user device GUI 206 notify the user 104 that "My Phone" (i.e., the user device 106) and "New Vehicle" (i.e., the vehicle system 112 in the vehicle 102) have been unpaired and all data 114 associated with the user device 106 has been deleted.

Figure 3A:
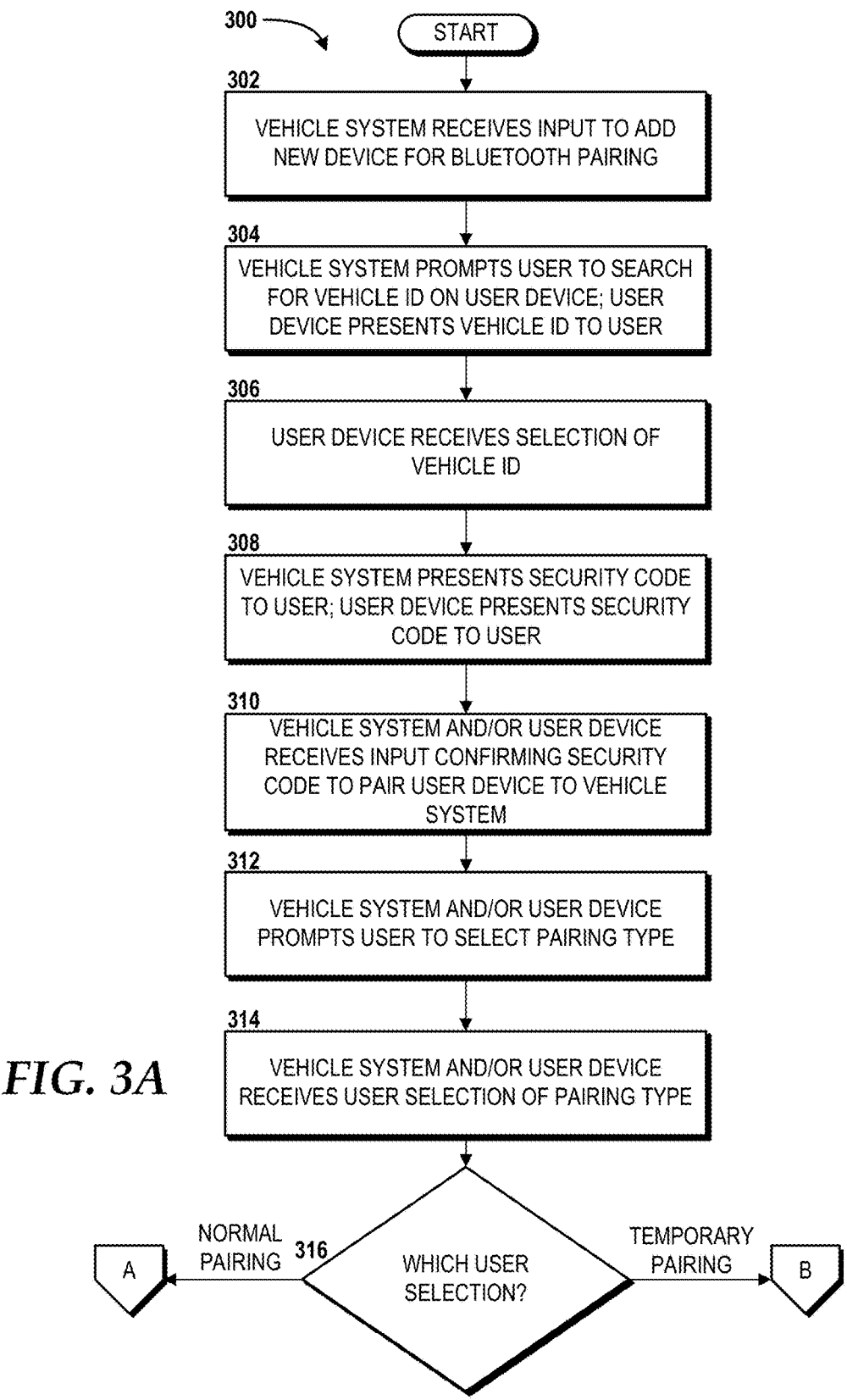
FIGS. 3A-3B are flow diagrams illustrating aspects of a method for providing temporary BLUETOOTH pairing, according to an illustrative embodiment of the concepts and technologies disclosed herein.
Figure 3B:
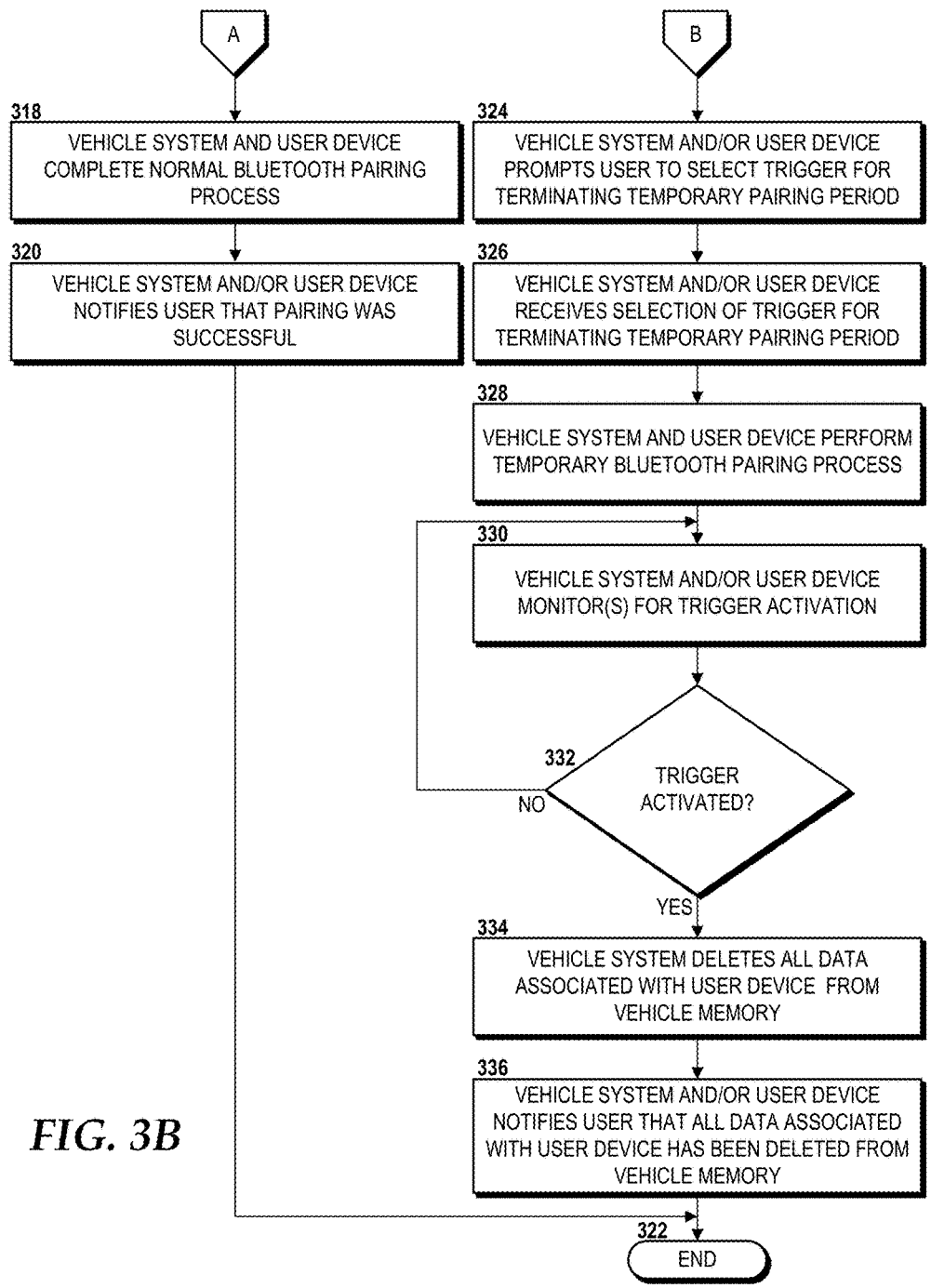

Turning now to FIGS. 3A-3B, flow diagrams illustrating aspects of a method 300 for providing temporary BLUETOOTH pairing will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the user device 106, the vehicle system 112, and/or one or more other computing systems and/or devices disclosed herein to perform operations.

For purposes of illustrating and describing some of the concepts of the present disclosure, the methods disclosed herein are described as being performed, at least in part, by the user device 106 and/or the vehicle system 112, as labeled, via execution of one or more software modules. It should be understood that additional and/or alternative devices can provide the functionality described herein via execution of one or more modules, applications, and/or other software. Thus, the illustrated embodiments are illustrative, and should not be viewed as being limiting in any way.

The method 300 will be described with reference to FIGS. 3A-3B and additional reference to FIG. 1 and the user interface diagrams FIGS. 2A-2J. The method 300 begins and proceeds to operation 302, where the vehicle system 112 receives input to add a new device for BLUETOOTH pairing. An example of this is shown in FIG. 2B, wherein the user 104 selects an "Add New Phone" icon from the vehicle system GUI 202. In some embodiments, the vehicle system 112 does not include a vehicle system display 200 or the vehicle system display 200 is otherwise unable to present icons such as shown in the illustrated example. In these embodiments, the input to add a new device for BLUETOOTH pairing can be provided via buttons, dials, or other input mechanisms provided by the vehicle system 112. It is contemplated that the option to add a new device can be provided via the user device GUI 206. In any case, the vehicle system 112 receives the input at operation 302 and the method 300 proceeds to operation 304.

At operation 304, the vehicle system 112 prompts the user 104 to search for a vehicle identifier presented on the user device display 204 of the user device 106, and the user device 106 presents on the user device display 204 the vehicle identifier associated with the vehicle system 112 of the vehicle 102. A non-limiting example of operation 304 is shown in FIG. 2C. From operation 304, the method 300 proceeds to operation 306, where the user device 106 receives selection of the vehicle identifier also as shown in FIG. 2C.

From operation 306, the method 300 proceeds to operation 308, where the vehicle system 112 presents a security code to the user 104 and the user device 106 likewise presents the security code to the user 104, as shown in FIG. 2D. From operation 308, the method 300 proceeds to operation 310, where the vehicle system 112 and/or the user device 106 receives input confirming the security code presented at operation 308, as also shown in FIG. 2D.

From operation 310, the method 300 proceeds to operation 312, where the vehicle system 112 and/or the user device 106 prompts the user 104 to select a pairing type—either a normal pairing or a temporary pairing—as shown in FIG. 2E. From operation 312, the method 300 proceeds to operation 314, where the vehicle system 112 and/or the user device 106 receives a selection by the user 104 of a pairing type, as also shown in FIG. 2E. From operation 314, the method 300 proceeds to operation 316, where the vehicle system 112 and/or the user device 106 determines which user selection was made—normal pairing or temporary pairing. In response to determining that the normal pairing option was selected, the method 300 proceeds to operation 318, as shown in FIG. 3B. At operation 318, the vehicle system 112 and the user device 106 complete the normal BLUETOOTH pairing process such that the user device 106 and the vehicle system 112 are paired until manually unpaired. From operation 318, the method 300 proceeds to operation 320, where the vehicle system 112 and/or the user device 106 notifies the user 104 that pairing was successful, as shown in FIG. 2I1. From operation 320, the method 300 proceeds to operation 322, where the method 300 ends.

Returning to FIG. 3A, and particularly to operation 316, if the vehicle system 112 and/or the user device 106 determines that the temporary pairing option was selected, the method 300 proceeds to operation 324, as shown in FIG. 3B. At operation 324, the vehicle system 112 and/or the user device 106 prompts the user 104 to select a trigger for terminating the temporary pairing period. In some embodiments, the trigger is or includes a temporary pairing time selected from a number of pre-set times, such as one or more days, or custom-defined by the user 104 in any unit of time, such as minutes, hours, days, weeks, month, and/or years, as shown in FIG. 2F. In some other embodiments, the trigger is or includes a temporary pairing time that automatically expires when the vehicle 102 is powered off, as shown in FIG. 2G. In other embodiments, the trigger is or includes a scan by the vehicle scanning device 124. From operation 324, the method 300 proceeds to operation 326, where the vehicle system 112 and/or the user device 106 receives selection of a trigger for terminating the temporary pairing period.

From operation 326, the method 300 proceeds to operation 328, where the vehicle system 112 and the user device 106 performs a temporary BLUETOOTH pairing process that can be terminated upon activation of the trigger selected at operation 326. From operation 328, the method 300 proceeds to operation 330, where the vehicle system 112 and/or the user device 106 monitors for trigger activation. From operation 330, the method 300 proceeds to operation 332, where the vehicle system 112 and/or the user device 106 determines whether the trigger has been activated. If the trigger has not been activated, the method 300 returns to operation 330, where the vehicle system 112 and/or the user device 106 continues to monitor for trigger activation. When the trigger has been activated, the method 300 proceeds to operation 334, where the vehicle system 112 deletes all data 114 associated with the user device 106 from the vehicle memory 116. If the user device 106 determines that the trigger has been activated, the user device 106 can generate and send a message to the vehicle system 112 to notify the vehicle system 112 that the trigger has been activated. Alternatively, the vehicle system 112 can make this determination without intervention from the user device 106.

From operation 334, the method 300 proceeds to operation 336, where the vehicle system 112 and/or the user device 106 notifies the user 104 that all data 114 associated with the user device 106 has been deleted from the vehicle memory 116. From operation 336, the method 300 proceeds to operation 322, where the method 300 ends.

In some embodiments, the vehicle system 112 can implement an idle-time backup trigger. The idle time backup trigger can specify a maximum idle time between BLUETOOTH connections. In other words, after the user device 106 and the vehicle system 112 are paired, an idle timer can be set to the maximum idle time. If the maximum idle time is reached, the vehicle system 112 can automatically delete all data 114 associated with the user device 106 from the vehicle memory 116. This provides a fail-safe in the event the vehicle 102 is sold by the user 104, or the user 104 is otherwise unavailable to access the vehicle system 112 to manually delete the data 114. By way of example, the idle timer might be set to 180 days, such that if the user device 106 is not reconnected via BLUETOOTH to the vehicle system 112 within that time, the vehicle system 112 will automatically delete the data 114.

Figure 4:
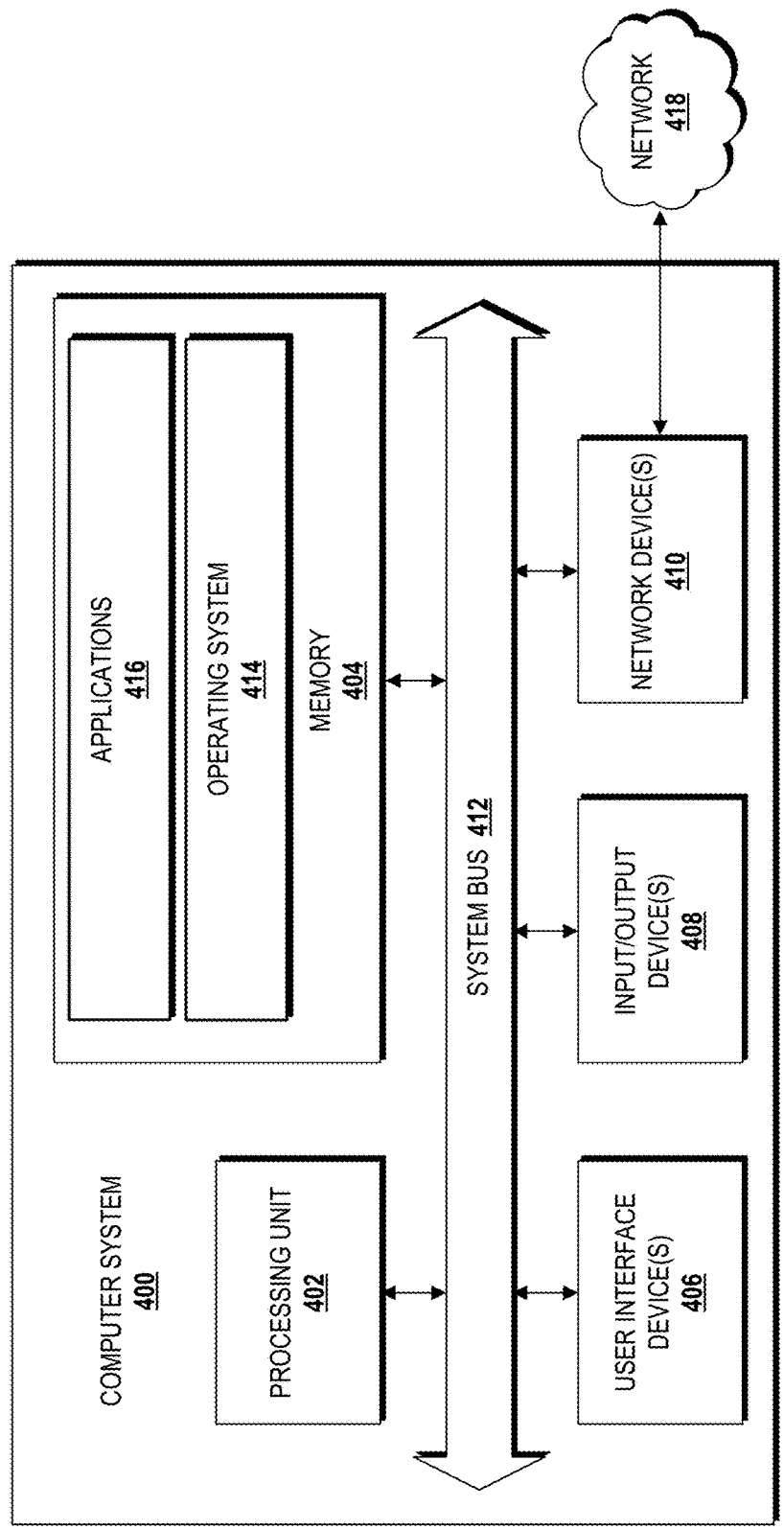
FIG. 4 is a block diagram illustrating an example computer system capable of implementing aspects of the embodiments presented herein.

FIG. 4 is a block diagram illustrating a computer system 400 configured to perform various operations disclosed herein. The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410. In some embodiments, the user device 106, the vehicle system 112, one or more components thereof, some combination thereof is/are configured, at least in part, like the computer system 400. It should be understood, however, that the user device 106 and/or the vehicle system 112 may include additional functionality or include less functionality than now described.

The processing unit 402 might be a standard central processor that performs arithmetic and logical operations, a more specific purpose programmable logic controller ("PLC"), a programmable gate array, or other type of processor known to those skilled in the art and suitable for controlling the operation of the computer system 400. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more applications 416. In some embodiments, the memory 404 includes the vehicle memory 116.

The operating system 414 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 406 may include one or more devices with which a user accesses the computer system 400. The user interface devices 406 may include, but are not limited to, computers, servers, personal digital assistants, telephones (e.g., cellular, IP, or landline), or any suitable computing devices. The I/O devices 408 enable a user to interface with the program modules. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, a touchscreen, or an electronic stylus. Further, the I/O devices 408 may include one or more output devices, such as, but not limited to, a display screen or a printer. In some embodiments, the I/O devices 408 include the vehicle BLUETOOTH interface 110.

The network devices 410 enable the computer system 400 to communicate with other networks or remote systems via a network 418. Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a WLAN such as a WI-FI network, a WWAN, a wireless PAN ("WPAN") such as BLUETOOTH, or a wireless MAN ("WMAN"). Alternatively, the network 418 may be a wired network such as, but not limited to, a WAN such as the Internet, a LAN such as the Ethernet, a wired PAN, or a wired MAN.

Figure 5:
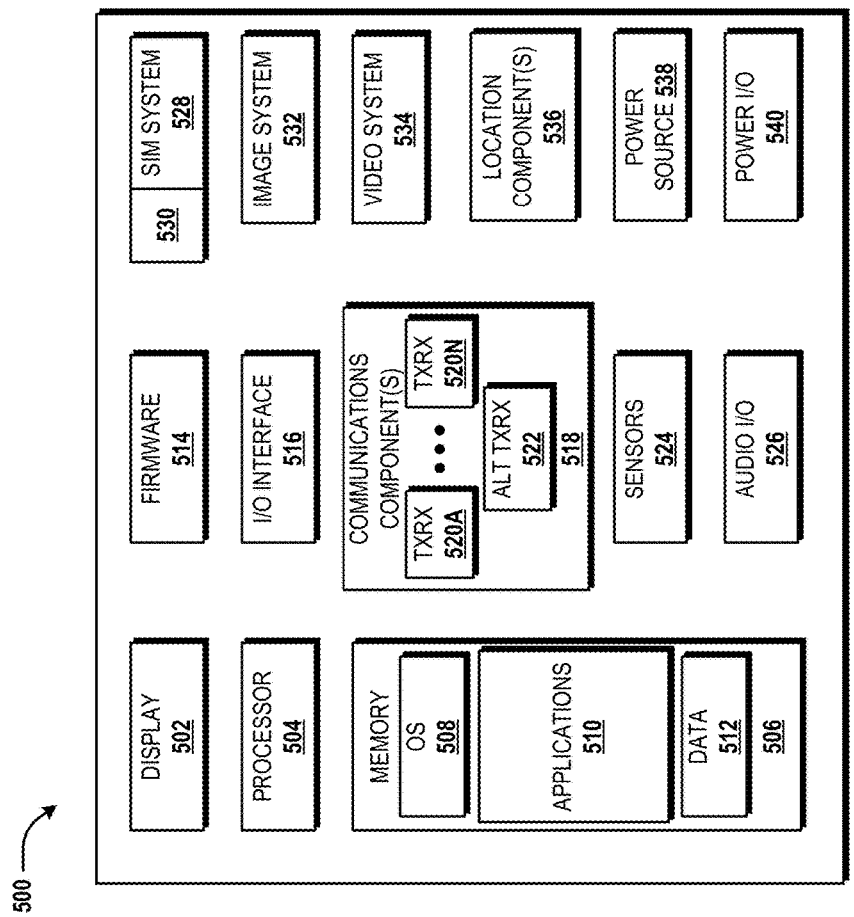
FIG. 5 is a block diagram illustrating an example mobile device capable of implementing aspects of the embodiments disclosed herein.

Turning now to FIG. 5, an illustrative mobile device 500 and components thereof will be described. In some embodiments, the user device 106 and/or the vehicle system 112 described above with reference to FIG. 1 can be configured as and/or can have an architecture similar or identical to the mobile device 500 described herein in FIG. 5. It should be understood, however, that the user device 106 and/or the vehicle system 112 may or may not include the functionality described herein with reference to FIG. 5. While connections are not shown between the various components illustrated in FIG. 5, it should be understood that some, none, or all of the components illustrated in FIG. 5 can be configured to interact with one another to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in the memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in data communications, entering/deleting data, entering and setting user IDs and passwords for device access, configuring settings, manipulating content and/or settings, multimode interaction, interacting with other applications 510, and otherwise facilitating user interaction with the operating system 508, the applications 510, and/or other types or instances of data 512 that can be stored at the mobile device 500.

The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, presence status information, user IDs, passwords, and application initiation (start-up) requests. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments, one or more of the transceivers of the communications component 518 may be configured to communicate using GSM, CDMAONE, CDMA2000, LTE, and various other 2G, 2.5G, 3G, 4G, 4.5G, and greater generation technology standards. Moreover, the communications component 518 may facilitate communications over various channel access methods (which may or may not be used by the aforementioned standards) including, but not limited to, TDMA, FDMA, W-CDMA, OFDM, SDMA, and the like.

In addition, the communications component 518 may facilitate data communications using GPRS, EDGE, the HSPA protocol family including HSDPA, EUL or otherwise termed HSUPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted-GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 500 or other devices or computers described herein, such as the computer system 500 described above with reference to FIG. 5. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 500 in order to store and execute the software components presented herein. It is also contemplated that the mobile device 500 may not include all of the components shown in FIG. 5, may include other components that are not explicitly shown in FIG. 5, or may utilize an architecture completely different than that shown in FIG. 5.

Figure 6:
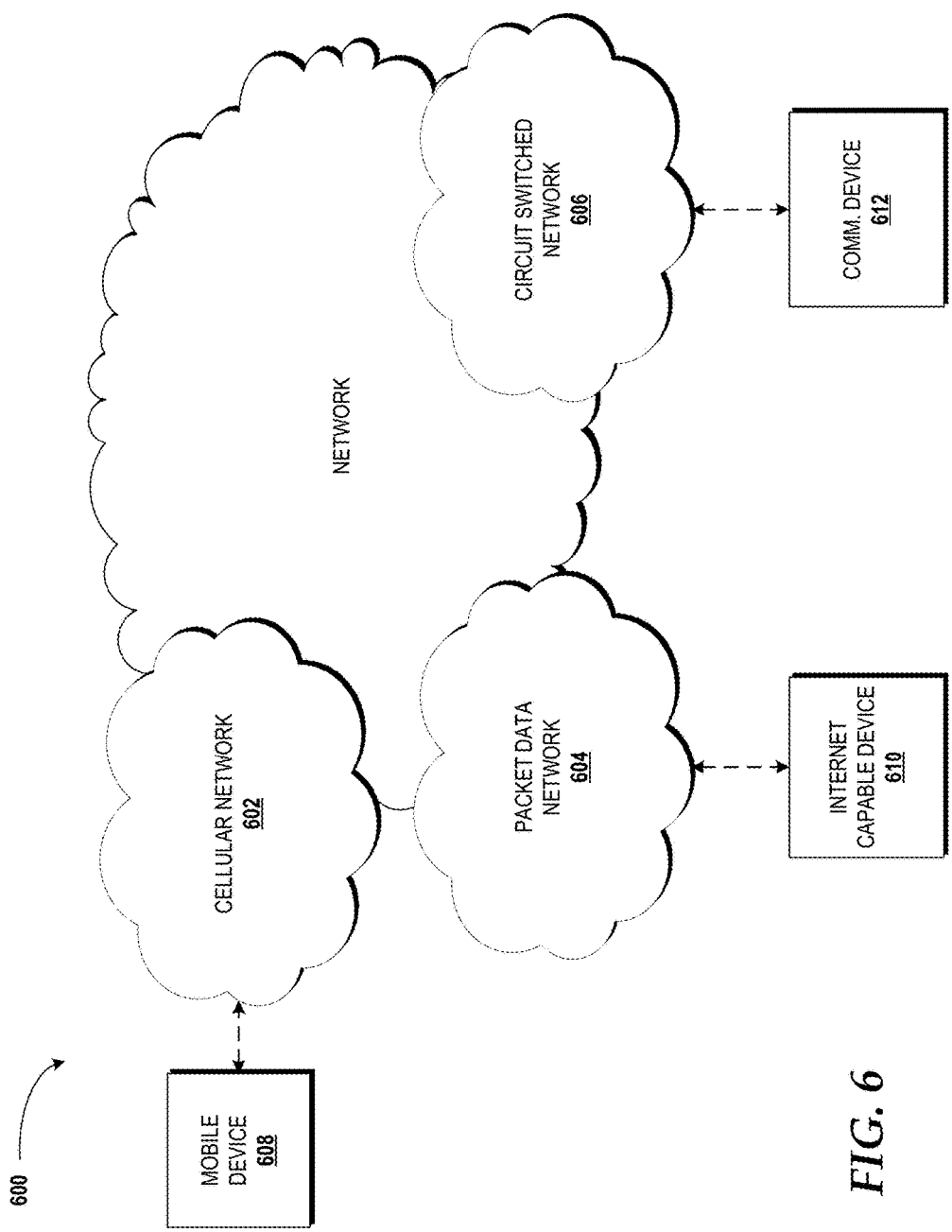
FIG. 6 is a diagram illustrating a network, according to an illustrative embodiment.

Turning now to FIG. 6, details of a network 600 are illustrated, according to an illustrative embodiment. The network 600 includes a cellular network 602, a packet data network 604, and a circuit switched network 606 (e.g., a public switched telephone network).

The cellular network 602 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, the user device 106, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, servers, computers, databases, and other devices in communication with one another, as is generally known. In some embodiments, the packet data network 604 is or includes one or more WI-FI networks, each of which can include one or more WI-FI access points, routers, switches, and other WI-FI network components. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, the user device 106, the vehicle system 112, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610.

Based on the foregoing, it should be appreciated that concepts and technologies for temporary BLUETOOTH pairing have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A vehicle system comprising:
   a processor; and
   memory having computer-executable instructions stored thereon that, when executed by the processor, cause the processor to perform operations comprising
   prompting a user to select a normal BLUETOOTH pairing option or a temporary BLUETOOTH pairing option for pairing a user device with the vehicle system via BLUETOOTH,
   receiving, from the user, selection of the temporary BLUETOOTH pairing option,
   in response to receiving the selection of the temporary BLUETOOTH pairing option, prompting the user to select a trigger for terminating a temporary pairing period during which the user device and the vehicle system are to be temporarily paired,
   receiving, from the user, selection of the trigger for terminating the temporary pairing period,
   pairing the user device and the vehicle system,
   receiving, from the user device, data associated with the user,
   storing, in the memory, the data associated with the user,
   monitoring for activation of the trigger,
   in response to the trigger being activated,
   terminating the temporary pairing period thereby unpairing the user device and the vehicle system, and
   deleting, from the memory, the data associated with the user.

2. The vehicle system of claim 1, wherein the trigger comprises a temporary pairing time.

3. The vehicle system of claim 2, wherein the temporary pairing time is selected from a number of pre-set times.

4. The vehicle system of claim 2, wherein the temporary pairing time is a custom time specified by the user.

5. The vehicle system of claim 1, wherein the trigger comprises a temporary pairing time that automatically expires when a vehicle associated with the vehicle system is powered off.

6. The vehicle system of claim 1, wherein the trigger comprises a scan by a vehicle scanning device associated with an entity other than the user.

7. The vehicle system of claim 1, wherein the operations further comprise:
   setting an idle-time backup trigger that specifies a maximum idle time between BLUETOOTH connections among the user device and the vehicle system; and
   upon expiration of the maximum idle time, deleting, from the memory, the data associated with the user.

8. The vehicle system of claim 1, further comprising an operating system, executable by the processor, wherein the operating system comprises APPLE IOS or LINUX.

9. A computer-readable storage medium having computer-executable instructions stored thereon that, when executed by a processor of a vehicle system, cause the vehicle system to perform operations comprising:
   prompting a user to select a normal BLUETOOTH pairing option or a temporary BLUETOOTH pairing option for pairing a user device with the vehicle system via BLUETOOTH;
   receiving, from the user, selection of the temporary BLUETOOTH pairing option;
   in response to receiving the selection of the temporary BLUETOOTH pairing option, prompting the user to select a trigger for terminating a temporary pairing period during which the user device and the vehicle system are to be temporarily paired;
   receiving, from the user, selection of the trigger for terminating the temporary pairing period;
   pairing the user device and the vehicle system;
   receiving, from the user device, data associated with the user;
   storing, in a vehicle memory, the data associated with the user;
   monitoring for activation of the trigger;
   in response to the trigger being activated,
   terminating the temporary pairing period thereby unpairing the user device and the vehicle system, and
   deleting, from the vehicle memory, the data associated with the user.

10. The computer-readable storage medium of claim 9, wherein the trigger comprises a temporary pairing time.

11. The computer-readable storage medium of claim 10, wherein the temporary pairing time is selected from a number of pre-set times.

12. The computer-readable storage medium of claim 10, wherein the temporary pairing time is a custom time specified by the user.

13. The computer-readable storage medium of claim 9, wherein the trigger comprises a temporary pairing time that automatically expires when a vehicle associated with the vehicle system is powered off.

14. The computer-readable storage medium of claim 9, wherein the trigger comprises a scan by a vehicle scanning device associated with an entity other than the user.

15. The computer-readable storage medium of claim 9, wherein the operations further comprise:
setting an idle-time backup trigger that specifies a maximum idle time between BLUETOOTH connections among the user device and the vehicle system; and
upon expiration of the maximum idle time, deleting, from the memory, the data associated with the user.

16. A method comprising:
prompting, by a vehicle system, a user to select a normal BLUETOOTH pairing option or a temporary BLUETOOTH pairing option for pairing a user device with the vehicle system via BLUETOOTH;
receiving, by the vehicle system, from a user, a selection of the temporary BLUETOOTH pairing option;
in response to receiving the selection of the temporary BLUETOOTH pairing option, prompting, by the vehicle system, the user to select a trigger for terminating a temporary pairing period during which the user device and the vehicle system are to be temporarily paired,
receiving, by the vehicle system, from the user, selection of the trigger for terminating the temporary pairing period;
pairing the user device and the vehicle system;
receiving, by the vehicle system, from the user device, data associated with the user;
storing, by the vehicle system in a vehicle memory, the data associated with the user;
monitoring, by the vehicle system, for activation of the trigger;
in response to the trigger being activated,
terminating, by the vehicle system, the temporary pairing period thereby unpairing the user device and the vehicle system, and
deleting, by the vehicle system, from the vehicle memory, the data associated with the user.

17. The method of claim 16, wherein the trigger comprises a temporary pairing time.

18. The method of claim 16, wherein the temporary pairing time is selected from a number of pre-set times or is a custom time specified by the user.

19. The method of claim 16, wherein the trigger comprises a temporary pairing time that automatically expires when a vehicle associated with the vehicle system is powered off.

20. The method of claim 16, wherein the trigger comprises a scan by a vehicle scanning device associated with an entity other than the user.

21. The method of claim 16, further comprising:
setting an idle-time backup trigger that specifies a maximum idle time between BLUETOOTH connections among the user device and the vehicle system; and
upon expiration of the maximum idle time, deleting, from the vehicle memory, the data associated with the user.

* * * * *